United States Patent
Kamiya

(10) Patent No.: US 12,330,644 B2
(45) Date of Patent: Jun. 17, 2025

(54) DRIVING SUPPORT DEVICE

(71) Applicant: TOYOTA JIDOSHA KABUSHIKI KAISHA, Toyota (JP)

(72) Inventor: Noriaki Kamiya, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 18/529,662

(22) Filed: Dec. 5, 2023

(65) Prior Publication Data
US 2024/0190428 A1    Jun. 13, 2024

(30) Foreign Application Priority Data
Dec. 9, 2022    (JP) .................... 2022-196970

(51) Int. Cl.
*B60W 30/14*    (2006.01)

(52) U.S. Cl.
CPC .................. *B60W 30/143* (2013.01)

(58) Field of Classification Search
CPC ...................................... B60W 30/14
See application file for complete search history.

(56) References Cited

U.S. PATENT DOCUMENTS

| | | |
|---|---|---|
| 8,355,851 B2 | 1/2013 | Inoue et al. |
| 8,370,040 B2 | 2/2013 | Inoue et al. |
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |

(Continued)

FOREIGN PATENT DOCUMENTS

JP    2010-089583 A    4/2010

OTHER PUBLICATIONS

Girard, A.R.; Sousa, J.B. de; Misener, J.A.; Hedrick, J.K. "A Control Architecture for Integrated Cooperative Cruise Control and Collision Warning Systems," Dec. 2001. Proceedings of the 40th IEEE Conference on Decision and Control (Cat. No. 01CH37228) (Year: 2001).*

*Primary Examiner* — Peter D Nolan
*Assistant Examiner* — Hyang Ahn
(74) *Attorney, Agent, or Firm* — Sughrue Mion, PLLC

(57) ABSTRACT

The driving support device includes: a vehicle speed controller configured to perform vehicle speed control, a system controller configured to perform at least one prerequisite control, and a storage device configured to store whether or not switching between enabling and disabling is permitted for each of the at least one prerequisite control, wherein the vehicle speed controller includes: determining whether each of the at least one prerequisite control is enabled or disabled in response to an operation of a driver of the vehicle for starting the vehicle speed control, determining, with reference to the storage device, whether or not enabling of the prerequisite control determined to be disabled is permitted, and in response to determining that enabling of the prerequisite control determined to be disabled is permitted, enabling the prerequisite control determined to be disabled and starting the vehicle speed control.

3 Claims, 4 Drawing Sheets

(56) References Cited

U.S. PATENT DOCUMENTS

| | | | |
|---|---|---|---|
| 2007/0139255 A1* | 6/2007 | Kamping | B60W 30/16 342/72 |
| 2019/0295419 A1 | 9/2019 | Tosa et al. | |
| 2020/0324761 A1* | 10/2020 | Magzimof | B60W 30/09 |

* cited by examiner

Fig.2

| PREREQUISITE SYSTEM | CURRENT SYSTEM STATE | AVAILABILITY OF AUTOMATIC SETUP |
|---|---|---|
| VEHICLE STABILITY CONTROL | ENABLE | UNAVAILABLE |
| AUTOMATIC BRAKE | DISABLE | AVAILABLE |
| ... | ... | ... |
| ... | ... | ... |

DRIVING SUPPORT DEVICE

CROSS-REFERENCE TO RELATED APPLICATIONS

This application claims the benefit of priority from Japanese Patent Application No. 2022-196970, filed on Dec. 9, 2022, the entire contents of which are incorporated herein by reference.

TECHNICAL FIELD

The present disclosure relates to driving support device.

BACKGROUND

Japanese Patent Application Publication No. 2010-089583 discloses a device for performing vehicle speed control. When a travel state of a vehicle and a surrounding environment of the vehicle satisfy conditions, the device is brought into a state capable of receiving a start instruction of vehicle speed control.

SUMMARY

In order to start the vehicle speed control, it may be a prerequisite that other controls are in a state in which they can exert their functions. In the following description, bringing the control into a state in which the control can exert its function is referred to as enabling the control, and bringing the control into a state in which the control cannot exert its function is referred to as disabling the control. The other control that is a prerequisite for starting the vehicle speed control is referred to as a prerequisite control. The device described in Japanese Patent Application Publication No. 2010-089583 may not be able to start the vehicle speed control when the prerequisite control is disabled. The present disclosure provides a technique capable of starting vehicle speed control without requiring an operation for enabling prerequisite control.

A driving support device according to an aspect of the present disclosure includes a vehicle speed controller, a system controller, and a storage device. The vehicle speed controller performs vehicle speed control. The system controller performs at least one prerequisite control. It is determined in advance that at least one prerequisite control is enabled as a prerequisite for starting the vehicle speed control. The storage device is connected to the vehicle speed controller and stores whether or not switching between enabling and disabling is permitted for each of at least one prerequisite control. The vehicle speed controller determines whether at least one prerequisite control is enabled or disabled according to an operation of a driver of the vehicle for starting the vehicle speed control. The vehicle speed controller refers to the storage device and determines whether or not enabling of the prerequisite control determined to be disabled is permitted. The vehicle speed controller enables the prerequisite control determined to be disabled and starts the vehicle speed control in response to determining that enabling of the prerequisite control determined to be disabled is permitted.

According to the driving support device, it is determined whether each prerequisite control is enabled or disabled in accordance with an operation of the driver for starting the vehicle speed control. Then, it is determined whether or not enabling of the prerequisite control determined to be disabled is permitted. Then, in response to determining that enabling of the prerequisite control determined to be disabled is permitted, the prerequisite control determined to be disabled is enabled, and the vehicle speed control is started. As described above, since the information indicating whether or not the enabling of the prerequisite control is permitted is stored in advance for each prerequisite control, the driving support device can automatically enable the prerequisite control determined to be disabled based on the permission. Therefore, the driving support device can start the vehicle speed control without requiring an operation for enabling the prerequisite control.

In one embodiment, the vehicle speed controller may be configured to disable the enabled prerequisite control when ending the vehicle speed control. In this case, when ending the vehicle speed control, the driving support device can return the prerequisite control to the state before the start of the vehicle speed control.

In one embodiment, the vehicle speed controller may be configured not to disable the enabled prerequisite control when the vehicle speed control is ended and an operating condition of the enabled prerequisite control is satisfied. In this case, the driving support device can avoid disabling the prerequisite control in operation when ending the vehicle speed control.

According to the present disclosure, there is provided a technique capable of starting vehicle speed control without requiring an operation for enabling prerequisite control.

BRIEF DESCRIPTION OF THE DRAWINGS

FIG. 2 is an example of information stored in a prerequisite system DB.

DETAILED DESCRIPTION

Hereinafter, embodiments of the present invention will be described with reference to the drawings.

Figure 1:
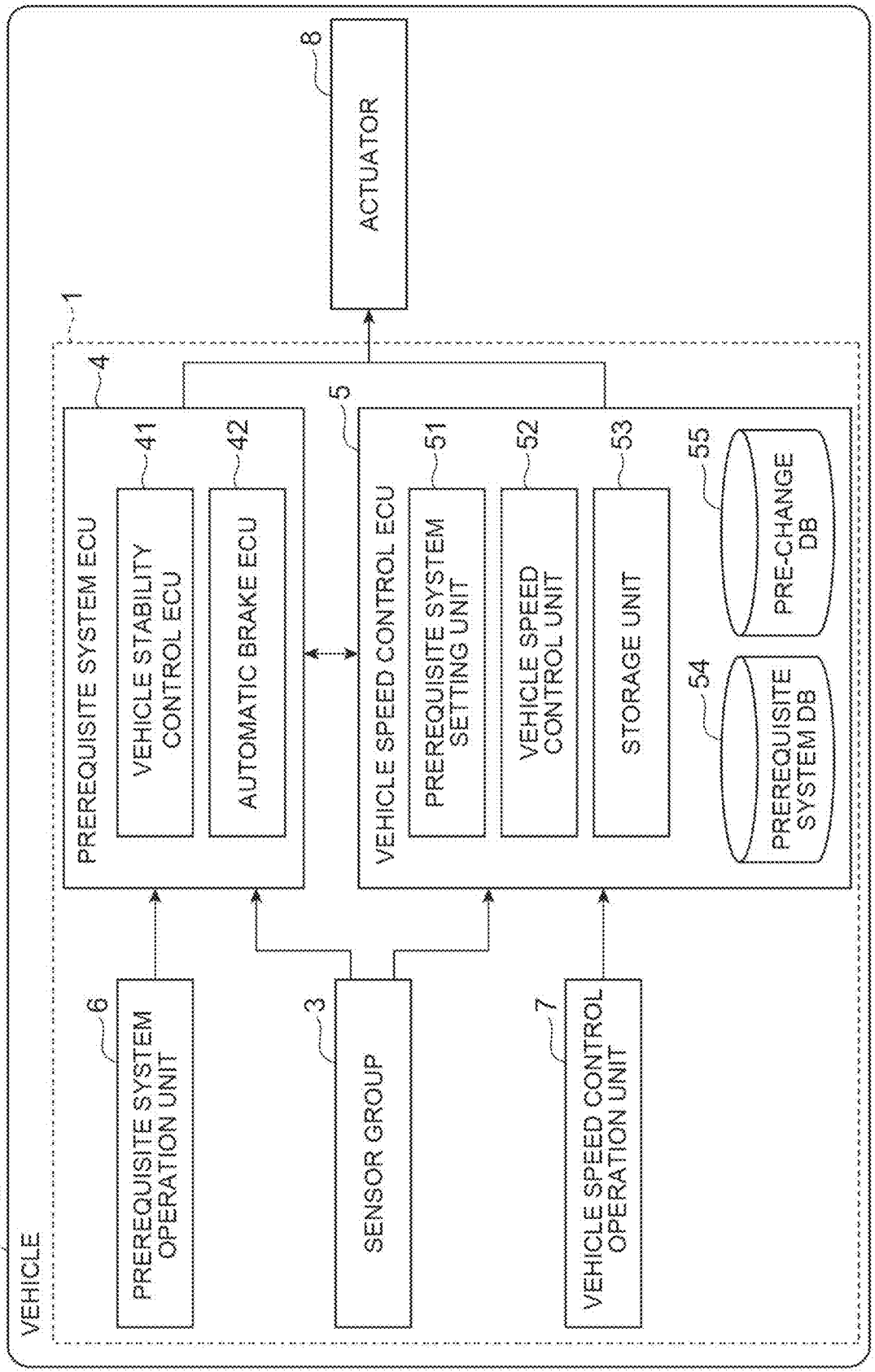
FIG. 1 is a block diagram illustrating a driving support device according to an embodiment of the present invention.

FIG. 1 is a block diagram illustrating a driving support device according to an embodiment of the present invention. As shown in FIG. 1, a driving support device 1 is mounted on a vehicle 2 as an example. The vehicle 2 may be, for example, an autonomous driving vehicle running in autonomous driving.

The driving support device 1 includes a sensor group 3, a prerequisite system electronic control unit (ECU) 4, and a vehicle speed control ECU 5. The ECU includes a central processing unit (CPU), a read only memory (ROM), a random-access memory (RAM), and a controller area network (CAN). The electronic control unit includes a communication circuit and the like. A prerequisite system ECU 4 may be an ECU that integrates a plurality of ECUs. The prerequisite system ECU 4 is an example of a system controller, and the vehicle speed control ECU 5 is an example of a vehicle speed controller.

The sensor group 3 includes at least one sensor. The sensor is, for example, an external sensor, a GPS receiving unit, or an internal sensor. The external sensor is a detection device that detects a situation around the vehicle 2. The external sensor may include at least one of a camera and a radar sensor. The internal sensor is a detection device that detects a travel state of the vehicle 2. The internal sensor may include at least one of a vehicle speed sensor, an acceleration sensor, and a yaw rate sensor.

The prerequisite system ECU 4 is connected to the sensor group 3 and includes at least one prerequisite system. The prerequisite system is a system that controls the behavior of the vehicle 2. The prerequisite system may be one system or may be a plurality of systems. It is predetermined that the prerequisite system is enabled as a prerequisite for starting the vehicle speed control. Hereinafter, the control executed by the prerequisite system is also referred to as prerequisite control. A state in which a control or system can perform its function is referred to as enabling the control or system, and a state in which the control or system cannot perform its function is referred to as disabling the control or system. As described above, the prerequisite system of the vehicle speed control is determined in advance, and the vehicle speed control can be started on condition that all the prerequisite systems are enabled.

The prerequisite system ECU 4 includes, by way of example, a vehicle stability control ECU 41 and an automatic brake ECU 42. The vehicle stability control ECU 41 performs, for example, vehicle stability control such as vehicle stability control (VSC). The automatic brake ECU 42 performs control for automatically operating the brake. The prerequisite system ECU 4 is connected to a prerequisite system operation unit 6. The prerequisite system operation unit 6 receives an operation of the driver for switching between enabling and disabling of the prerequisite system. The prerequisite system operation unit 6 is a user interface such as a button or a touch panel as an example. The prerequisite system ECU 4 has a function of switching between enabling and disabling of the prerequisite system in accordance with the operation of the driver received by the prerequisite system operation unit 6. The prerequisite system ECU 4 has a function of switching between enabling and disabling of the prerequisite system in accordance with a signal output from the vehicle speed control ECU 5 described later.

The vehicle speed control ECU 5 is connected to the sensor group 3 and the prerequisite system ECU 4 and includes a prerequisite system setting unit 51, a vehicle speed control unit 52, a storage unit 53, a prerequisite system DB 54 and a pre-change DB 55. The prerequisite system DB 54 is an example of a storage device.

The vehicle speed control unit 52 performs vehicle speed control of the vehicle 2. The vehicle speed control includes behavior control or follow-up control in the front-rear direction. The vehicle speed control unit 52 operates an actuator 8 of the vehicle 2 based on the detection result of the sensor group 3 to perform vehicle speed control. The actuator 8 includes, for example, drive actuators and brake actuators. The vehicle speed control unit 52 starts the vehicle speed control in response to the operation of the driver of the vehicle 2 for starting the vehicle speed control. For example, a vehicle speed control operation unit 7 receives an operation of a driver of the vehicle 2 for starting vehicle speed control. The vehicle speed control operation unit 7 is a user interface such as a button or a touch panel as an example.

The prerequisite system setting unit 51 determines whether or not the prerequisite system is enabled before the vehicle speed control by the vehicle speed control unit 52. For example, the prerequisite system setting unit 51 determines whether each prerequisite system is enabled or disabled in response to the vehicle speed control operation unit 7 receiving an operation of the driver for starting the vehicle speed control. When determining that the prerequisite system is disabled, the prerequisite system setting unit 51 outputs a signal for switching the enabling and disabling of the prerequisite system to the prerequisite system ECU 4. The prerequisite system setting unit 51 outputs a signal to the prerequisite system ECU 4 to switch between enabling and disabling with respect to a prerequisite system in which switching between enabling and disabling is permitted by the driver. For example, the prerequisite system setting unit 51 realizes the above-described function based on information obtained by referring to the prerequisite system DB 54.

FIG. 2 is an example of information stored in a prerequisite system DB. As shown in FIG. 2, the prerequisite system DB 54 stores information defining a vehicle speed control prerequisite system. The prerequisite system DB 54 stores a prerequisite system, a current system state, and whether automatic setup is available in association with one another. The current system state indicates whether the prerequisite system is in an enabled state or a disabled state. The automatic setup availability indicates whether or not switching between enabling and disabling of the prerequisite system is permitted. The storage unit 53 has a function of storing information in the prerequisite system DB 54. The storage unit 53 updates the current system state in real time based on signals transmitted sequentially from the prerequisite system ECU 4. The storage unit 53 stores an initial value or a value designated by the driver as to whether or not automatic setup is available.

In the example shown in FIG. 2, vehicle stability control and automatic brake are defined as the prerequisite system. In the vehicle stability control, "enabled" is stored as the current system state, and "unavailable" is stored as whether or not automatic setup is available. That is, the vehicle stability control is a prerequisite system in which switching between enabling and disabling for vehicle speed control cannot be performed, and the current system state is an enabled state in which vehicle speed control can be executed. The automatic brake is a prerequisite system capable of switching between enabling and disabling states for vehicle speed control, and is a disabled state in which vehicle speed control cannot be executed as the current system state.

The prerequisite system setting unit 51 refers to the prerequisite system DB 54 to determine whether it is permitted to enable the prerequisite system that has been determined to be disabled. For example, the prerequisite system setting unit 51 refers to the prerequisite system DB 54 and determines whether the automatic setup availability of the prerequisite system in which the current system state is "disable" is stored as "available". The prerequisite system setting unit 51 enables the prerequisite system determined to be disabled in response to determining that the prerequisite system determined to be disabled is permitted to be enabled. The prerequisite system setting unit 51 outputs a signal to the prerequisite system ECU 4 to "enable" the system state of the prerequisite system that was determined to be disabled. For example, the prerequisite system setting unit 51 may output a signal to the prerequisite system ECU 4 to enable automatic brake. This allows the prerequisite system ECU 4 to automatically switch between enabling and disabling the prerequisite system to achieve the system state specified by the prerequisite system setting unit 51.

The vehicle speed control unit 52 starts the vehicle speed control when the prerequisite system setting unit 51 causes the prerequisite system to be enable and the vehicle 2 travel state and the surrounding environment in the vehicle 2 satisfy conditions.

The vehicle speed control unit 52 ends the vehicle speed control, for example, when an end condition is satisfied. The termination condition is a case where a preceding vehicle does not exist in a low speed range, a case where there is a defect in the sensor group 3 or a component, a case where there is a termination instruction by a driver, or the like. When the vehicle speed control is ended, the prerequisite system setting unit 51 is configured to disable the prerequisite system that has been enabled before the start of the vehicle speed control. For example, the storage unit 53 stores the system state in the pre-change DB 55 before switching between enabling and disabling by the prerequisite system setting unit 51. When the vehicle speed control unit 52 ends the vehicle speed control, the prerequisite system setting unit 51 refers to the pre-change DB 55 and disables the prerequisite system that has been enabled. Thus, the prerequisite system automatically enabled by the prerequisite system setting unit 51 can be returned to be disabled when the vehicle speed control is ended.

In a case where the vehicle speed control is ended and the operating condition of the enabled prerequisite system is satisfied, the prerequisite system setting unit 51 may not disable the enabled prerequisite system. That is, the prerequisite system setting unit 51 does not disable the prerequisite system when the prerequisite system is operating, in other words, when the function of the prerequisite system is being exerted. For example, the prerequisite system setting unit 51 does not disable automatic brake control when the automatic brake ECU 42 is enabled and automatic brake control is active.

Figure 3:
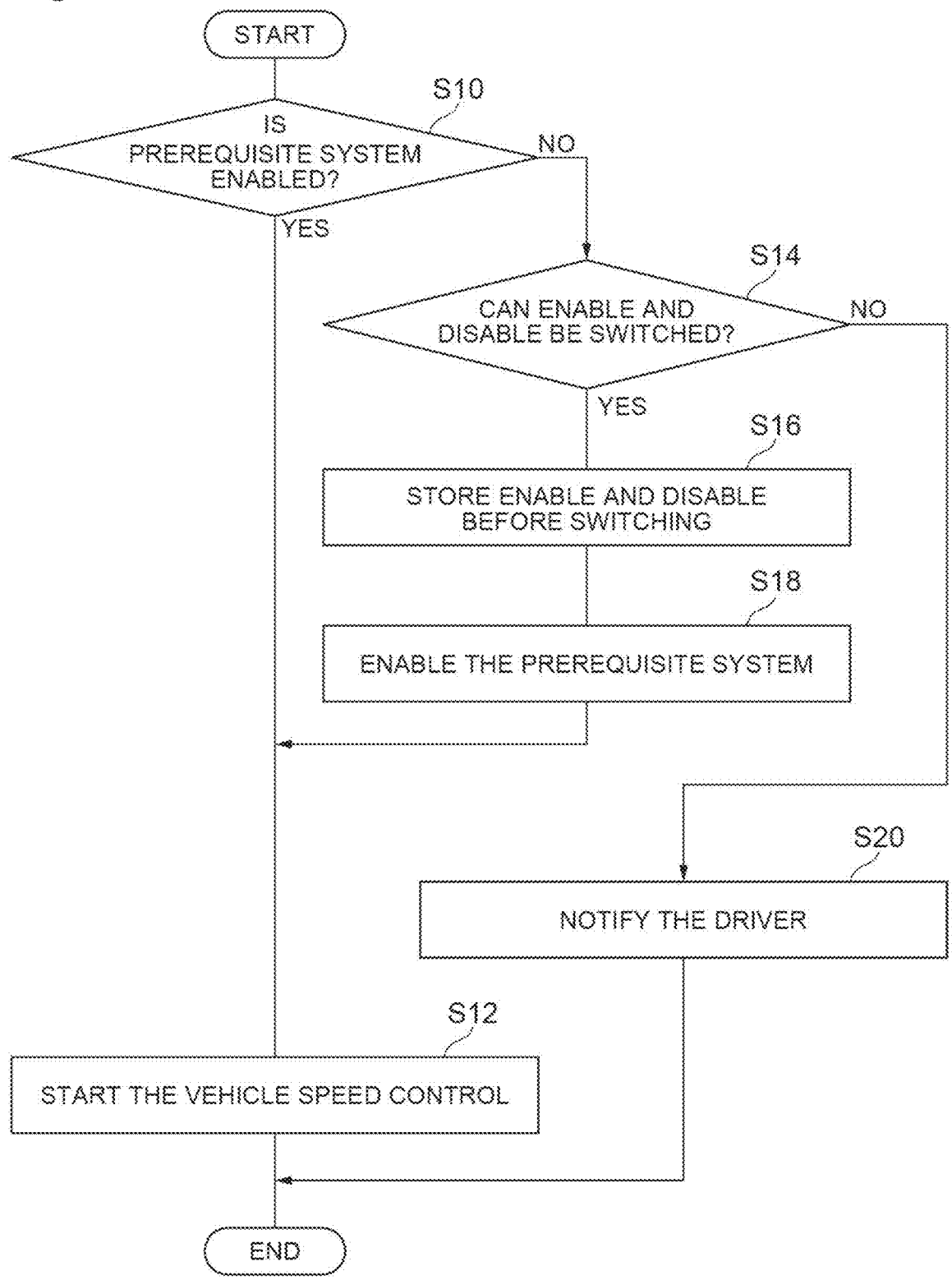
FIG. 3 is a flowchart illustrating an operation of the driving support device.
Figure 4:
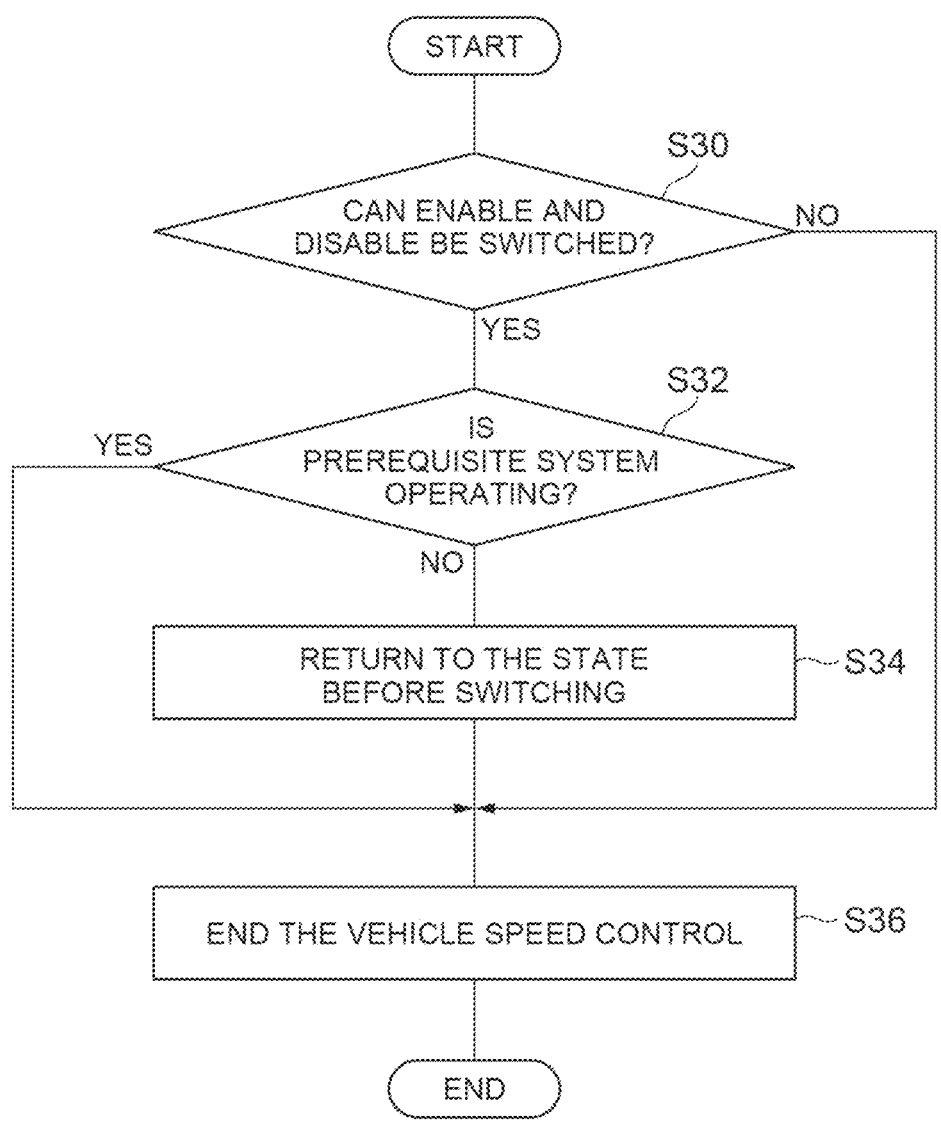
FIG. 4 is a flowchart illustrating an operation of the driving support device.

The operation of the driving support device 1 will now be outlined. FIGS. 3 and 4 are flowcharts illustrating an operation of the driving support device. The flowchart shown in FIG. 3 is started when the vehicle speed control operation unit 7 of the driving support device 1 receives a start instruction operation of the vehicle speed control.

As shown in FIG. 3, first, the prerequisite system setting unit 51 of the driving support device 1 determines whether the prerequisite system is enabled (step S10). When it is determined that the prerequisite system is enabled (step S10: YES), the vehicle speed control unit 52 of the driving support device 1 starts the vehicle speed control (step S12), and the flowchart illustrated in FIG. 3 ends.

When it is determined that the prerequisite system is not enabled (step S10: NO), the prerequisite system setting unit 51 determines whether the enabling and disabling of the prerequisite system determined to be disabled can be switched (step S14). The prerequisite system setting unit 51 determines whether or not switching is possible with reference to the prerequisite system DB 54, for example. When it is determined that the prerequisite system determined to be disabled is switchable (step S14: YES), the driving support device 1 the storage unit 53 stores the system state before switching in the pre-change DB 55 (step S16).

Subsequently, the prerequisite system setting unit 51 enables the prerequisite system determined to be disabled (step S18). Then, the vehicle speed control unit 52 starts the vehicle speed control (step S12), and the flowchart shown in FIG. 3 ends.

When it is determined that the prerequisite system determined to be disabled cannot be switched (step S14: NO), the driving support device 1 does not execute the vehicle speed control and notifies the driver of the fact that the vehicle speed control is not executed and/or the reason thereof (step S20), and the flowchart illustrated in FIG. 3 ends.

By executing the flowchart shown in FIG. 3, the driving support device 1 can start the vehicle speed control by automatically enabling the prerequisite system that has been disabled.

The flowchart shown in FIG. 4 is started when it is determined that the vehicle speed control is being executed due to the vehicle speed control unit 52 of the driving support device 1 and the termination condition of the vehicle speed control is satisfied.

As shown in FIG. 4, the prerequisite system setting unit 51 determines whether or not to switch the prerequisite system with reference to the prerequisite system DB 54, for example (step S30). When it is determined that the prerequisite system is switchable (step S30: YES), the prerequisite system setting unit 51 determines whether or not the prerequisite system is operating (step S32). When it is determined that the prerequisite system is not in operation (step S32: NO), the prerequisite system setting unit 51 refers to the pre-change DB 55 and returns the enabled and disabled states of the prerequisite system to the state before the execution of the vehicle speed control.

Subsequently, the vehicle speed control unit 52 ends the vehicle speed control (step S36), and the flowchart shown in FIG. 4 ends.

When it is determined that the prerequisite system cannot be switched (step S30: NO), or when it is determined that the prerequisite system is in operation (step S32: YES), the vehicle speed control unit 52 ends the vehicle speed control (step S36), and the flowchart shown in FIG. 4 ends.

By executing the flowchart shown in FIG. 4, the driving support device 1 can automatically disable the enabled prerequisite system and end the vehicle speed control. Also, the already active prerequisite system remains enabled even if it is a prerequisite system that was enabled by the driving support device 1.

Summary of Embodiment

According to the driving support device 1, it is determined whether each prerequisite system is enabled or disabled according to the operation of the driver of the vehicle 2 for starting the vehicle speed control. Then, it is determined whether or not the prerequisite system determined to be disabled is permitted to be enabled. Then, in response to the determination that the prerequisite system determined to be disabled is permitted to be enabled, the prerequisite system determined to be disabled is enabled, and the vehicle speed control is started. As described above, since the information indicating whether or not enabling of the prerequisite system is permitted is stored in advance for each prerequisite system, the driving support device 1 can automatically enable the prerequisite system determined to be disabled based on the permission. Therefore, the driving support device 1 can start the vehicle speed control without requiring an operation to enable the prerequisite system.

While exemplary embodiments have been described above, various omissions, substitutions, and changes may be made without being limited to the exemplary embodiments described above. For example, the prerequisite system ECU 4 is not limited to the vehicle stability control ECU 41 and the automatic brake ECU 42, and may not include these ECUs or may include other ECUs. The driving support device 1 may not include the prerequisite system operation unit 6. The driving support device 1 may not include the vehicle speed control operation unit 7. In addition, the ECU illustrated in FIG. 1 may be configured as one ECU in which a plurality of ECUs is integrated. For example, the vehicle speed control ECU 5 and the ECU (for example, the automatic brake ECU 42) of the prerequisite system may be configured as one ECU.

DESCRIPTION OF REFERENCE NUMERALS

1 . . . driving support device, 2 . . . vehicles, 4 . . . prerequisite system ECU (an example of a system controller), 5 . . . vehicle speed control ECU (an example of a vehicle speed controller), 54 . . . a prerequisite system DB (an example of a storage device)

What is claimed is:

1. A driving support device comprising:
a vehicle speed controller configured to perform vehicle speed control;
a system controller configured to perform at least one prerequisite control, wherein it is determined in advance that the at least one prerequisite control is enabled as a prerequisite for starting the vehicle speed control; and
a storage device connected to the vehicle speed controller and configured to store whether or not switching between enabling and disabling is permitted for each of the at least one prerequisite control,
wherein the vehicle speed controller comprises:
determining whether each of the at least one prerequisite control is enabled or disabled in response to an operation of a driver of a vehicle for starting the vehicle speed control;
determining, with reference to the storage device, whether or not enabling of the prerequisite control determined to be disabled is permitted; and
in response to determining that enabling of the prerequisite control determined to be disabled is permitted, enabling the prerequisite control determined to be disabled and starting the vehicle speed control.

2. The driving support device according to claim 1, wherein the vehicle speed controller is configured to disable the enabled prerequisite control when ending the vehicle speed control.

3. The driving support device according to claim 2, wherein the vehicle speed controller is configured not to disable the enabled prerequisite control when the vehicle speed control is ended and an operation condition of the enabled prerequisite control is satisfied.

* * * * *